United States Patent [19]

Snow

[11] 4,363,841
[45] Dec. 14, 1982

[54] LAMINATED PACKAGING MATERIAL

[75] Inventor: John E. Snow, Minneapolis, Minn.

[73] Assignee: Champion International Corporation, Stamford, Conn.

[21] Appl. No.: 334,581

[22] Filed: Dec. 28, 1981

[51] Int. Cl.³ .................. B65D 85/70; B32B 1/02; B32B 1/04

[52] U.S. Cl. ..................... 428/35; 428/192; 428/216; 428/461; 428/463; 428/476.1; 428/483; 428/516; 428/518; 428/520

[58] Field of Search .............. 428/35, 192, 215, 216, 428/461, 463, 476.1, 483, 516, 518, 520

[56] References Cited

U.S. PATENT DOCUMENTS

| | | | |
|---|---|---|---|
| 3,445,324 | 5/1969 | Curler et al. | 428/216 |
| 3,514,367 | 5/1970 | James | 428/216 |
| 3,524,795 | 8/1970 | Peterson | 428/216 |
| 3,616,190 | 10/1971 | Shaw | 428/461 |
| 4,085,244 | 4/1978 | Stillman | 428/35 |
| 4,096,309 | 6/1978 | Stillman | 428/461 |
| 4,172,915 | 10/1979 | Sheptak et al. | 428/461 |
| 4,190,477 | 2/1980 | Ossian et al. | 428/461 |
| 4,241,130 | 12/1980 | Barnes | 428/476.1 |
| 4,309,466 | 1/1982 | Stillman | 428/483 |

*Primary Examiner*—William J. Van Balen
*Attorney, Agent, or Firm*—Evelyn M. Sommer

[57] ABSTRACT

A laminated packaging material suitable for use in flexible containers for potato chips, corn chips, and the like, comprises (A) as an outer surface, a transparent sheet of nylon, polyester, cellophane, or polypropylene, (B) a coextruded laminate of pigmented polyethylene and ethylene acrylic acid copolymer, (C) a metallic foil, preferably aluminum, and (D) a heat-sealable polyolefin as an inner surface. Bags prepared from this packaging material have excellent moisture resistance and sealing properties.

16 Claims, 2 Drawing Figures

LAMINATED PACKAGING MATERIAL

BACKGROUND OF THE INVENTION

This invention relates to laminated packaging materials for foodstuffs. More particularly, it relates to a laminated material suitable for use in flexible containers for foods such as potato chips, corn chips, and the like.

Flexible walled pouches, bags and similar containers have been used with satisfactory results, and to an increasing extent, in the packaging of products such as potato chips and corn chips where it is essential that the freshness of the product be maintained for a number of months. Generally, such containers are prepared from multi-layered laminated packaging materials whose layers comprise polyolefin resin films and metallic foil. The packaging materials may have from 2 to 8 or more discrete layers, of which one or more layers may consist of adhesive material.

U.S. Pat. No. 3,616,190 discloses a laminated packaging material comprising—in order from the outer surface to the inner surface—cellophane, polyethylene, aluminum foil and heat-sealable polyethylene. The cellophane functions both as an outer surface and as a decorative surface, the decorative design being printed in reverse on the inner side of the cellophane sheet.

U.S. Pat. No. 4,096,309 discloses a laminate comprising a non-woven outer sheet of spun-bonded polymer such as polyethylene, polypropylene or polyester. The next adjacent layer can be a polyolefin film such as polyethylene or polypropylene. The next adjacent layer is a metallic foil and the innermost layer is a heat-sealable polyolefin such as polyethylene or polypropylene. As an outer surface layer, there is preferably provided a face ply of a smooth, nonporous material, such as kraft paper.

U.S. Pat. No. 4,190,477 discloses a laminate of (1) polyester or nylon, (2) metallic foil, (3) extrusion-grade propylene polymer or copolymer and (4) a sealant layer of polypropylene, polyethylene or ethylene vinyl acetate.

In the packaging of foodstuffs such as potato chips, corn chips, and the like, the packages are generally imprinted on the outermost layer of a laminate from which the package is made. When the outermost layer is transparent, the printing thereon is often difficult to discern, particularly, if the package contents do not provide sufficient contrast between the lettering and its background. In addition, one or more layers of metal foil are typically included in the laminate materials from which such packages are formed. It is often difficult to obtain a proper bond between the foil and the other layers of the laminate. It would therefore be desirable to provide a packaging material in which the layer underlying the transparent outer layer is pigmented and serves to provide a strong bond to a subsequent layer of metal foil.

SUMMARY OF THE INVENTION

This invention provides a laminated packaging material. The outermost layer is a transparent sheet of nylon, polyester, cellophane, or polypropylene, which may be printed. Affixed to the transparent sheet is a coextruded laminate of pigmented polyethylene and ethylene acrylic acid copolymer. Affixed to the coextruded laminate is a metallic foil, preferably aluminum. The innermost layer, affixed to the metallic foil is a heat-sealable polyolefin. The pigmented coextruded laminate provides a suitable background to the imprinted outermost layer and also provides a strong bond to the metallic foil layer.

DETAILED DISCLOSURE

Figure 1:
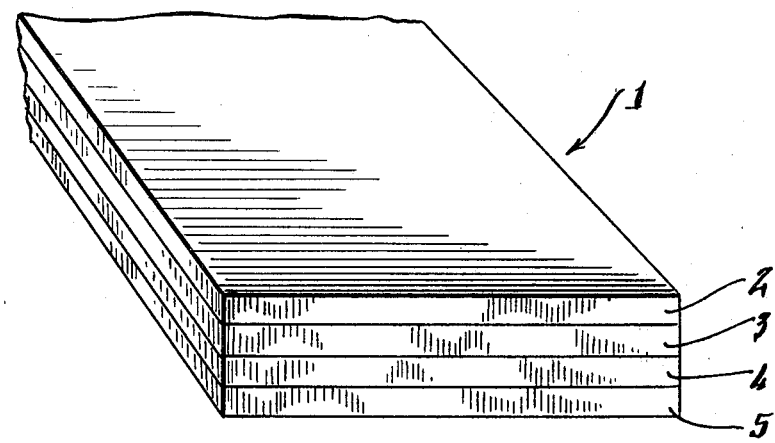
FIG. 1 is a perspective view showing the laminated packaging material of this invention.

The outermost layer of the packaging material of this invention comprises a transparent sheet of nylon, polyester, cellophane or polypropylene, which may be printed. Its thickness can range from about 0.3 to about 2.0 mils, preferably from 0.5 to 1 mil. This transparent sheet is affixed to the next adjacent layer by any method known in the art such as, for example, by use of a transparent adhesive substance such as a washcoat primer, typically a polyethylene amine.

The second layer, a coextruded laminate of a pigmented or clear polyethylene and an ethylene acrylic acid copolymer ("EAA"), has a thickness of from about 0.3 to about 2.0 mils, preferably from 0.5 to 1 mil. This composite layer functions to provide an adhesive layer for bonding to a subsequent metal foil layer. In addition, the pigmentation of this layer facilitates its use as a background for print on the outermost layer. Preferably, the pigment incorporated into the polyethylene is titanium dioxide, although any other suitable pigment can be similarly employed. The pigment can be present in an amount ranging from about 5 to about 25% by weight, preferably about 10 to about 20% and most preferably about 13%. This type of coextrusion also offers improved package flex, puncture, and tensile properties.

The metallic foil layer can be composed of any of the flexible metal foils known in the art, preferably aluminum. The thickness of the foil ranges from about 0.25 to about 0.50 mils and is preferably about 0.35 mils. The metallic foil provides an excellent barrier against penetration of gases and moisture through the laminated material. In addition, it provides protection from ultraviolet light.

The innermost layer of the laminated packaging material is composed of heat-sealable polyolefin which can be applied either as an extrusion coating with the aid of a primer, as a film with the aid of an adhesive, as a coextrusion of ethylene acrylic acid copolymer and polyethylene, or any combination thereof. This layer should have a thickness of from about 0.5 to about 3 mils, preferably from 1 to 2 mils; such thickness ensures ready sealability, contributes substantially to the vapor and water-impermeability of the laminate as a whole, and also provides flexibility.

Examples of heat-sealable polyolefins usable in the laminates of this invention are low density linear low density and medium density polyethylenes. The important consideration in the choice of heat-sealable polyethylene is that it have a softening range which will ensure non-melting under the conditions of heat sealing and filling.

Strong adherence between the various layers of these laminates is essential. The various polymeric layers adjacent both surfaces of the metallic foil may be applied to the metallic foil by conventional melt-extrusion procedures, but it is preferable for the various layers to be affixed by means of adhesives. Suitable adhesives are, for example, ethylene acrylic acid copolymers, shellac and polyurethane. The adhesive layers are preferably comprised of coextruded layers of ethylene acrylic acid copolymer and polyethylene. This method provides a convenient means of making the laminates and also provides enhanced composite integrity.

The laminates of this invention may be prepared by any of the means common in the art. The preferred means of such formation will vary in known manner, dependent upon available machinery and the selection of what, if any, optional layers are to be employed.

Once the laminate material is formed, the manufacture of bags, pouches and like containers is also within the ordinary skill in the art. Thus, for example, an essentially rectangular sheet of the present laminate may be folded at its approximate mid-point and any two free sides then joined by the application of heat sufficient to heat-seal their edges. Such technique results in a four-sided envelope construction which may then be filled with the desired contents prior to heat-sealing of the remaining edge. Alternatively, such a container can be manufactured by placing two separate sheets of the laminate face-to-face and heat-sealing the adjoining polyolefin film surface along the edges thereof. If only three edges are initially heat-sealed, the container can be filled through the opening present at the unsealed edge. The opening may then be heat-sealed, resulting in the final closed package.

In many of the desired uses for the present packaging materials and containers made therefrom, it is desired to avoid the presence of oxygen within the enclosed container. Because of the high impermeability to gases or liquids provided by the laminates of the present invention, such a storage environment is readily obtained. It is necessary merely to flush the container envelope with inert gas or apply a vacuum through conventional means to void oxygen from the container. Subsequent heat-sealing of the final edge then ensures a protective environment for the container contents.

Referring now to the drawings, FIG. 1 depicts a four-ply laminated packaging material 1 in accordance with the present invention. Only the essential layers are depicted, and not the adhesives which can be employed in a preferred embodiment of this invention. The layers are: a transparent sheet of nylon, polyester, cellophane, or polypropylene 2; a coextruded laminate of pigmented polyethylene and ethylene acrylic acid copolymer 3; a metallic foil 4; and a heat-sealable polyolefin 5. The heat-sealable layer 5 may also be a coextruded laminate of polyethylene and ethylene acrylic acid copolymer in which case the ethylene acrylic acid copolymer will serve as the adhesive or bond promoter.

Figure 2:
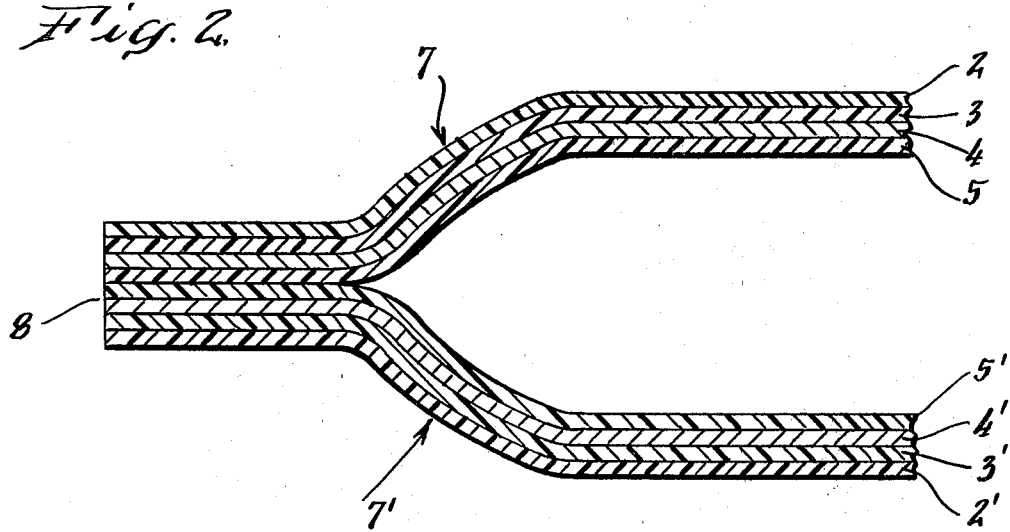
FIG. 2 is a partial cross-sectional view of a pouch composed of two adherent laminate materials of this invention.

FIG. 2 illustrates a cross-sectional view of a portion of a pouch formed from two laminated packaging films according to this invention. The opening within the pouch shows a degree of expansion of the pouch within which its contents would be held. Also shown is the orientation of the two packaging laminate 7 and 7'. The two separate layers of heat-sealable polyolefin 5 and 5' are in contact along their edges and bondable, one to the other, so as to form a single, double thickness of heat-sealed polyethylene 8 along the perimeter of the pouch. The remaining layers 2, 3 and 4 of laminate 7 and 2', 3' and 4' of laminate 7' are of the same compositions as previously described with respect to FIG. 1.

The packaging material of the present invention is particularly useful in packages containing condiments such as ketchup and salad dressings and in snack packages. The improved bonding to the metal foil layer provided by the polyethylene and EAA coextruded layer provides improved flexure and puncture strength.

What is claimed is:

1. A laminated packaging material comprising
   (a) a transparent film of nylon, polyester, cellophane or polypropylene as an outer surface;
   (b) a coextruded laminate of pigmented polyethylene and an ethylene acrylic acid copolymer, said coextruded laminate affixed to said transparent film with the pigmented polyethylene adjacent the transparent film;
   (c) a metallic foil affixed to the ethylene acrylic acid copolymer of said coextruded laminate; and
   (d) a heat-sealable inner polyolefin containing layer affixed to said metallic foil.

2. The laminated packaging material of claim 1 wherein said heat-sealable inner polyolefin containing layer is polyethylene.

3. The laminated packaging material of claim 1 wherein said heat-sealable inner polyolefin containing layer is a coextruded layer of polyethylene and an ethylene acrylic acid copolymer with the ethylene acrylic acid copolymer adjacent said metallic foil.

4. The laminated packaging material of claim 1 in which the transparent outer surface film has a thickness of from about 0.3 to about 2.0 mils, the coextruded laminate of pigmented polyethylene and an ethylene acrylic acid copolymer has a thickness of from about 0.3 to about 2.0 mils, the metallic foil has a thickness of from about 0.25 to about 0.50 mils, and the heat-sealable inner polyolefin containing layer has a thickness of from about 0.5 to about 3 mils.

5. The laminated packaging material of claim 2 in which the transparent outer surface film has a thickness of from about 0.3 to about 2.0 mils, the coextruded laminate of pigmented polyethylene and an ethylene acrylic acid copolymer has a thickness of from about 0.3 to about 2.0 mils, the metallic foil has a thickness of from about 0.25 to about 0.50 mils, and the heat-sealable inner polyolefin containing layer has a thickness of from about 0.5 to about 3 mils.

6. The laminated packaging material of claim 3 in which the transparent outer surface film has a thickness of from about 0.3 to about 2.0 mils, the coextruded laminate of pigmented polyethylene and an ethylene acrylic acid copolymer has a thickness of from about 0.3 to about 2.0 mils, the metallic foil has a thickness of from about 0.25 to about 0.50 mils, and the heat-sealable inner polyolefin containing layer has a thickness of from about 0.5 to about 3 mils.

7. The laminated packaging material of claim 4 in which the transparent outer surface film has a thickness of from 0.5 to 1 mil, the coextruded laminate of pigmented polyethylene and an ethylene acrylic acid copolymer has a thickness of from 0.5 to 1 mil, the foil has a thickness of about 0.35 mils and the heat-sealable inner polyolefin containing layer has a thickness of from 1 to 2 mils.

8. The laminated packaging material of claim 5 in which the transparent outer surface film has a thickness of from 0.5 to 1 mil, the coextruded laminate of pigmented polyethylene and an ethylene acrylic acid copolymer has a thickness of from 0.5 to 1 mil, the foil has a thickness of about 0.35 mils and the heat-sealable inner polyolefin containing layer has a thickness of from 1 to 2 mils.

9. The laminated packaging material of claim 6 in which the transparent outer surface film has a thickness of from 0.5 to 1 mil, the coextruded laminate of pigmented polyethylene and an ethylene acrylic acid copolymer has a thickness of from 0.5 to 1 mil, the foil has a thickness of about 0.35 mils and the heat-sealable inner polyolefin containing layer has a thickness of from 1 to 2 mils.

10. The laminated packaging material of claim 1 in which the metallic foil is aluminum.

11. The laminated packaging material of claim 2 in which the metallic foil is aluminum.

12. The laminated packaging material of claim 3 in which the metallic foil is aluminum.

13. The laminated packaging material of claim 1 in which the pigmented polyethylene contains from about 5 to about 25% pigment.

14. The laminated packaging material of claim 13 wherein the pigment is titanium dioxide.

15. The packaging material of claim 14 in which the pigmented polyethylene film contains about 10% titanium dioxide.

16. A flexible pouch formed by heat sealing two parallel panels of the laminated packaging material of claim 1 along the edges of their respective inner heat-sealable surfaces forming a space therebetween.

* * * * *